(12) United States Patent
Nies et al.

(10) Patent No.: US 7,997,876 B2
(45) Date of Patent: Aug. 16, 2011

(54) WIND TURBINE, TOWER AND METHOD FOR FABRICATING THE SAME

(75) Inventors: Jacob Johannes Nies, Zwolle (NL); Tahir Hassan Malik, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/751,102

(22) Filed: Mar. 31, 2010

(65) Prior Publication Data

US 2011/0135493 A1   Jun. 9, 2011

(51) Int. Cl.
*F03D 11/04* (2006.01)

(52) U.S. Cl. ............... 416/244 R; 416/DIG. 6; 52/40; 52/169.13; 52/651.07; 52/848; 29/888; 29/888.02

(58) Field of Classification Search ............ 415/2.1–4.5, 415/213.1, 905–908; 416/244 R, 244 A, 416/DIG. 6; 290/44, 55; 52/40, 169.13, 52/651.07, 831, 848; 29/888, 888.02, 889, 29/889.2, 889.3
See application file for complete search history.

(56) References Cited

U.S. PATENT DOCUMENTS

| | | | |
|---|---|---|---|
| 1,674,169 A * | 6/1928 | Flettner | 416/4 |
| 3,922,827 A | 12/1975 | Rosenblatt | |
| 4,261,147 A | 4/1981 | Agsten | |
| 4,715,782 A * | 12/1987 | Shimmel | 416/32 |
| 6,467,233 B1 | 10/2002 | Maliszewski et al. | |
| 7,445,420 B2 * | 11/2008 | Yoshida | 415/4.3 |
| 2009/0107567 A1 * | 4/2009 | Crary | 137/560 |
| 2009/0243296 A1 * | 10/2009 | Letas | 290/44 |
| 2009/0249707 A1 | 10/2009 | Curme | |
| 2010/0126079 A1 * | 5/2010 | Kristensen | 52/40 |

FOREIGN PATENT DOCUMENTS

| | | |
|---|---|---|
| EP | 0821161 B1 | 5/2000 |
| WO | WO-2007/144146 A1 * | 12/2007 |
| WO | 2009126696 A1 | 10/2009 |

* cited by examiner

*Primary Examiner* — Christopher Verdier
(74) *Attorney, Agent, or Firm* — James W. Pemrick; Ernest G. Cusick; Frank A. Landgraff (57) ABSTRACT

A wind turbine, tower and method for making same are provided. The wind turbine includes a rotor having one or more blades and a rotor radius distance approximately equal to the distance measured from a centerline of the rotor to a tip of one of the blades. The tower has one or more tower sections, including a first tower section having a generally cylindrical or frusto-conical shape. The first tower section has at least one first diameter. A reduced diameter tower section is connected to the first tower section, and has a waist portion with at least one second diameter that is smaller than the first diameter. At least a portion of the reduced diameter tower section having the second diameter is located about one rotor radius distance from the centerline of the rotor, and the reduced diameter section provides increased static clearance to the tip of the blades.

12 Claims, 6 Drawing Sheets

WIND TURBINE, TOWER AND METHOD FOR FABRICATING THE SAME

BACKGROUND OF THE INVENTION

The subject matter described herein relates generally to wind turbines and, more particularly, to a wind turbine tower and a system and method for fabricating or making a wind turbine tower.

Many known wind turbines include a tower and a rotor mounted on the tower via a nacelle. The rotor includes a number of blades that facilitate converting wind energy into rotational energy. The rotor typically drives a generator through a gearbox via a rotor shaft, and the gearbox steps up the inherently low rotational speed of the rotor shaft such that the generator can convert the mechanical energy to electrical energy.

The blades of the rotor are configured to have a specific clearance between their lowest point of travel and the tower. It would be undesirable to have the blades strike the tower during operation of the turbine. However, known solutions to this problem include tilting the rotor up at a predetermined angle and/or using blades with a predetermined stiffness. Blade cost and weight increase as additional materials are required to stiffen the blades. Stiffer blades can also result in higher stress levels in the tower.

BRIEF DESCRIPTION OF THE INVENTION

In one aspect of the present invention, a wind turbine is provided. The wind turbine includes a rotor having one or more blades and a rotor radius distance approximately equal to the distance measured from a centerline of the rotor to a tip of one of the blades. The tower has one or more tower sections, including a first tower section having a generally cylindrical or frusto-conical shape. The first tower section has at least one first diameter. A reduced diameter tower section is connected to the first tower section, and has a waist portion with at least one second diameter that is smaller than the first diameter. At least a portion of the reduced diameter tower section having the second diameter is located about one rotor radius distance from the centerline of the rotor, and the reduced diameter section provides increased static clearance to the tip of the blades.

In another aspect of the present invention, a wind turbine tower for supporting a rotor is provided. The rotor has one or more blades and a rotor radius distance approximately equal to the distance measured from a centerline of the rotor to a tip of one of the blades. The wind turbine tower has one or more tower sections, including a first tower section having a generally cylindrical or frusto-conical shape. The first tower section has at least one first diameter. A reduced diameter tower section is connected to the first tower section, and has a waist portion with at least one second diameter that is smaller than the first diameter. At least a portion of the reduced diameter tower section having the second diameter is located about one radius distance from the centerline of the rotor. The reduced diameter section provides increased static clearance to the tip of the blades.

In yet another aspect of the present invention, a method for providing a wind turbine tower is provided. The wind turbine tower supports a rotor having one or more blades and a rotor radius distance approximately equal to the distance measured from a centerline of the rotor to a tip of one of the blades. The wind turbine tower has one or more tower sections. The method includes the step of providing a first tower section having a substantially cylindrical or substantially frusto-conical shape, the first tower section having at least one first diameter. Another step provides a reduced diameter tower section having a waist portion with at least one second diameter, the second diameter being smaller than the first diameter. A connecting step connects the first tower section to the reduced diameter tower section, and a locating step locates at least a portion of the reduced diameter tower section about one radius distance from the centerline of the rotor.

DETAILED DESCRIPTION OF THE INVENTION

The following detailed description describes a wind turbine, wind turbine tower and method for fabricating or making a tower by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to an exemplary embodiment, namely, a wind turbine tower. However, it is contemplated that this disclosure has general application to towers in a broad range of systems and in a variety of applications other than wind turbines.

Figure 1:
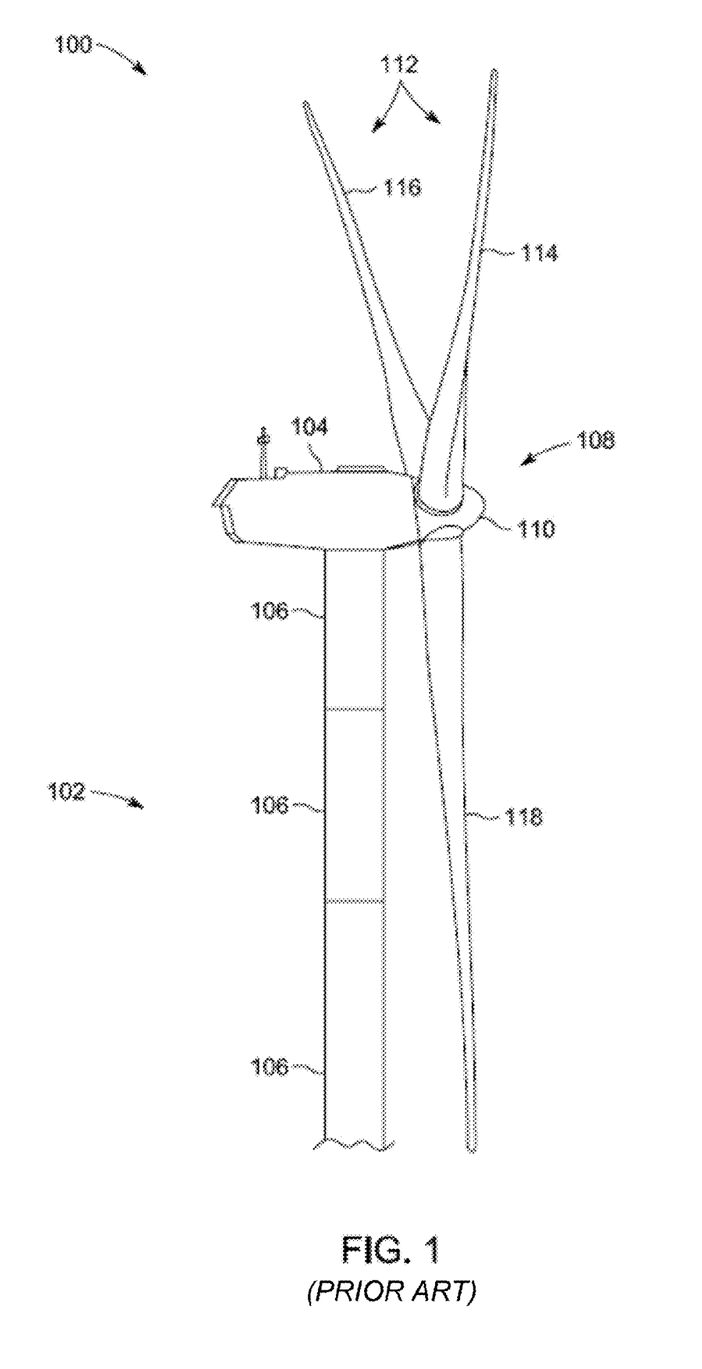
FIG. 1 is a side elevation illustration of a wind turbine.

FIG. 1 is a side elevation view of an exemplary wind turbine 100. In the exemplary embodiment, wind turbine 100 is a horizontal axis wind turbine. Alternatively, wind turbine 100 may be a vertical axis wind turbine. Wind turbine 100 includes a tower 102 erected from a foundation (not shown), a nacelle 104 mounted on tower 102, and a rotor 108 rotatably coupled to nacelle 104. Tower 102 includes a plurality of tower sections 106 that are stacked atop of one another and are coupled together using a suitable coupler or fastener, such as a plurality of bolts, for example.

In the exemplary embodiment, rotor 108 includes a rotatable hub 110 and a plurality of rotor blades 112 coupled to and extending outwardly from hub 110. In the exemplary embodiment, rotor blades 112 include a first rotor blade 114, a second rotor blade 116, and a third rotor blade 118. In other embodiments, rotor 108 may include any suitable number of rotor blades 112. In the exemplary embodiment, rotor blades 112 are generally equidistantly spaced about hub 110 to facilitate enabling kinetic energy of the wind to be converted into rotational energy and, subsequently, into electrical energy. Alternatively, rotor blades 112 may be spaced any suitable distance from one another about hub 110.

Figure 2:
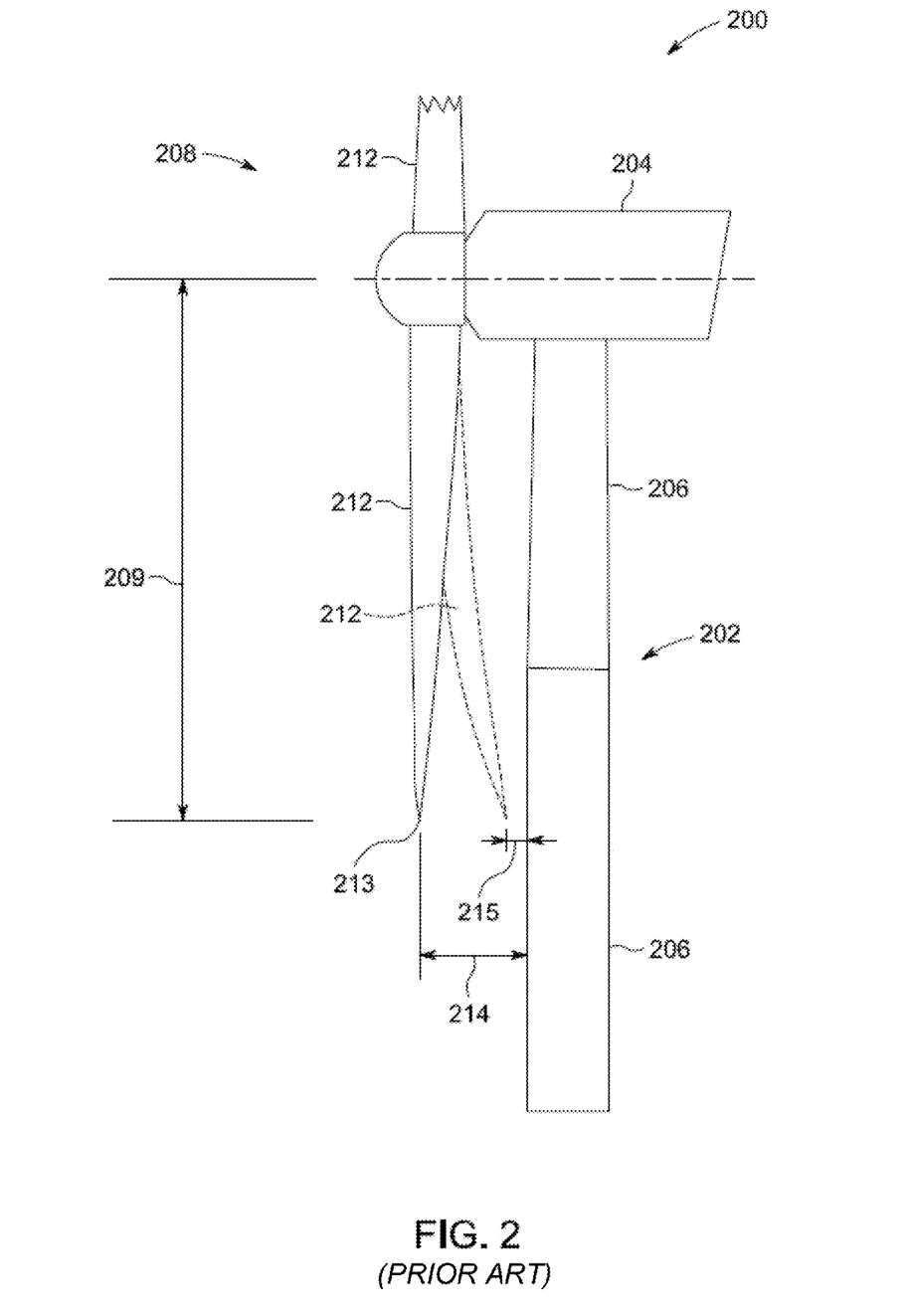
FIG. 2 is a side elevation illustration of a wind turbine.

FIG. 2 is a side elevation view of one known wind turbine 200 including tower 202, nacelle 204 and rotor 208 having blades 212. The tower 202 typically includes multiple sections 206 which may be cylindrical in cross-section or have a tapered cross-section with the largest diameter near the bottom and the smallest diameter at the top. The rotor 208 has a radius 209, which is approximately equal to a length of one of the blades 212 plus half the diameter of the hub 110.

Blade 212 will flex inward when under load, as indicated by the blade 212 shown in phantom. The tip 213 of the blade 212, shown in its lowest position during rotation, has a static clearance distance indicated by 214. The static clearance is defined as the distance between the tower's outer diameter to the blade tip, at lowest position, under no-load conditions. During operation of the turbine, the wind will load the blades and under the maximum load the blades will flex as shown by the phantom blade 212. The blade tip 213 will move closer to the tower and have a reduced clearance as indicated by 215. The blades 212 should be designed with a stiffness that prevents them from hitting tower 202 during operational conditions. Typically, extra material and stiffening elements must be used to reinforce blade 212, and this extra material adds weight and increases cost. The stiff blades also may transmit more loads to structural components of the wind turbine 100. It would be desirable to be able to use lighter and more flexible blades to reduce cost and loads on the wind turbine.

Figure 3:
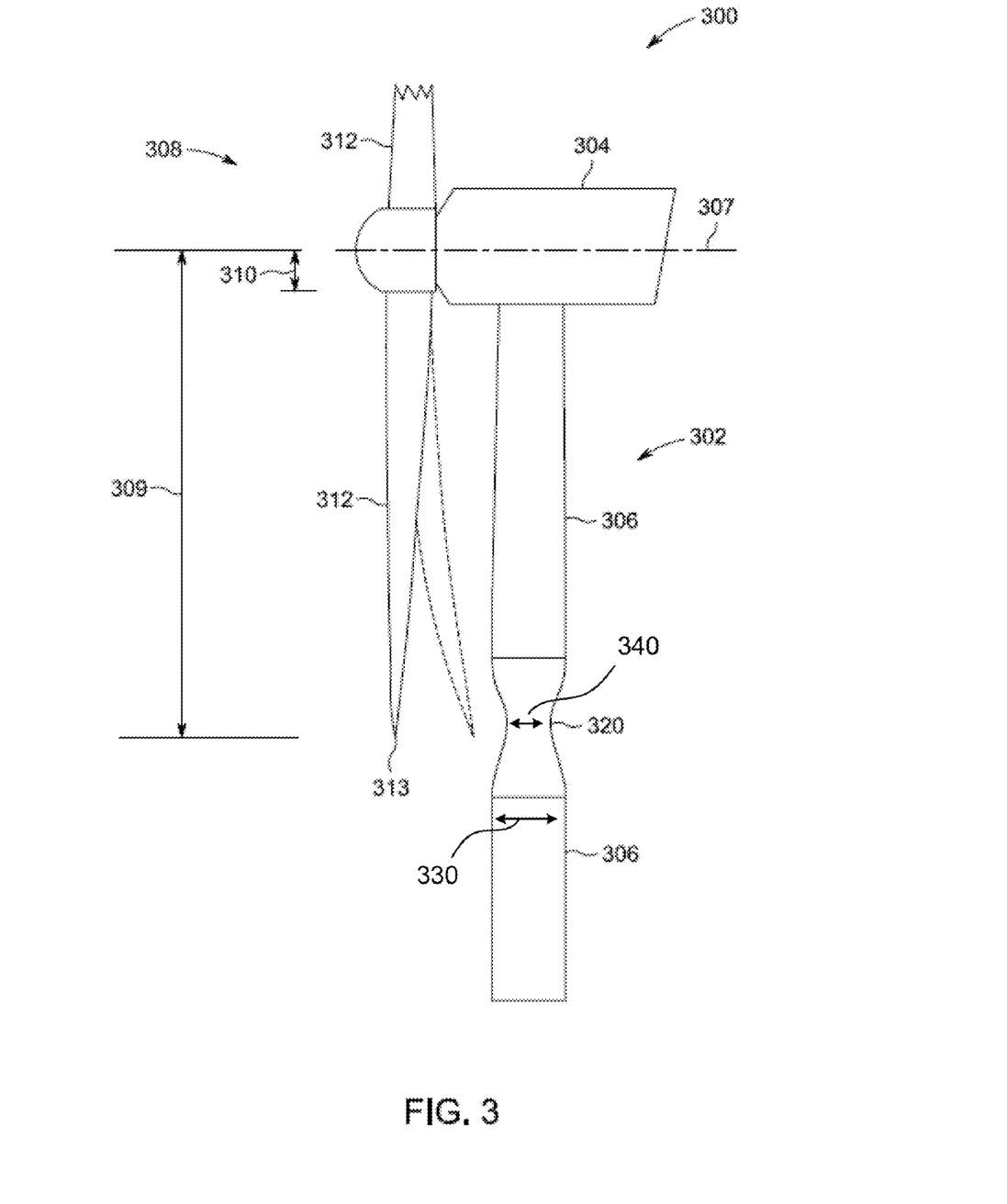
FIG. 3 is a side elevation illustration of a wind turbine, according to an aspect of the present invention.

FIG. 3 illustrates a side elevation view of a wind turbine 300 including tower 302, nacelle 304 and rotor 308 having blades 312, according to one aspect of the present invention. The tower 302 typically may include multiple sections 306 which may be cylindrical or have a tapered shape with a larger diameter near the bottom and a smaller diameter near the top. Tower sections 306 may also be frusto-conical in shape. The rotor 308 has a radius 309, which is approximately equal to a length of one of the blades 312 plus half the diameter of the hub 310.

The tower 302 includes a reduced diameter tower section 320 located near the radius 309 of the rotor 308. The tip 313 of one of the blades 312 is shown in its lowest position during rotation. The position of the reduced diameter tower section 320, in tower 302, can be about 100% of the radius 309 of rotor 308 below the rotor's centerline 307, or about equal to a length of one of the blades 312 plus half the height 310 of the hub. The first tower section 306 may have a first diameter 330, and the reduced diameter tower section may have a waist portion with a second diameter 340. As a non-limiting example only, for a 60 meter radius rotor 308, the narrowest part of reduced diameter section 320 can be positioned about 60 meters below the rotor's centerline 307. The entire length of section 320 may extend about 50% of the rotor's radius below centerline 307 to about 150% of the rotor's radius below centerline 307. The reduced diameter section 320 may be comprised of monolithic section, or it may be comprised of multiple sections. For example, section 320 could be obtained by stacking multiple "cans" (e.g., cylindrical, frusto-conical or tapered tower sections) having various diameters on top of one another. In general, it is preferred to have the smallest diameter section of reduced diameter section 320 located near the blade tip's lowest vertical position. The outer profile of the reduced diameter section 320 may have any suitable shape, including but not limited to, hyperbolic, concave, hour-glass, tapered, conical, frusto-conical, as well as variations on these shapes. In FIG. 3, the reduced diameter section is shown to have a generally hour-glass shaped profile. The thickness of the tower wall may be increased in all or portions of the reduced diameter section 320, in order to counteract the reduction in either strength or stiffness due to the reduction in tower diameter.

Figure 4:
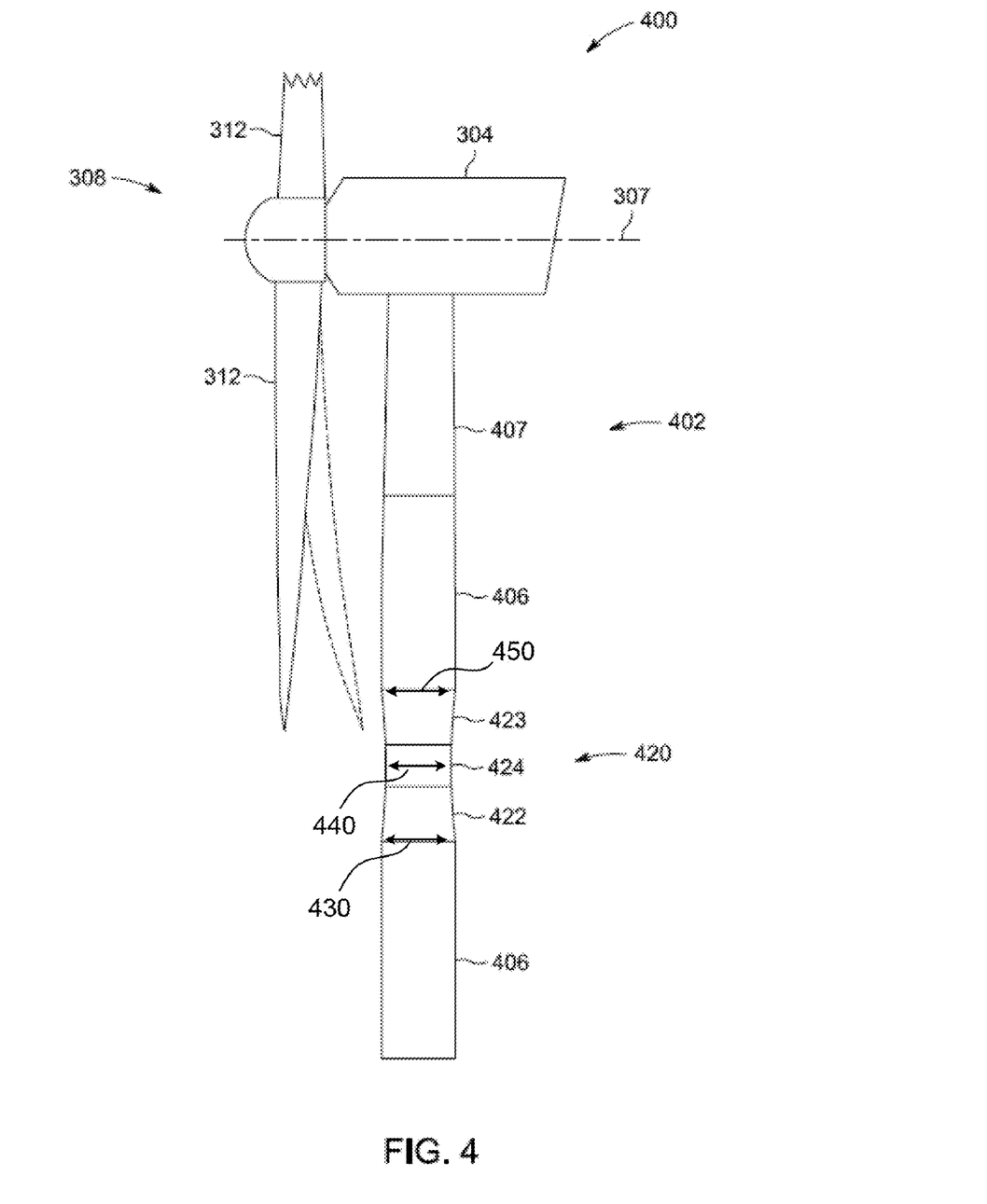
FIG. 4 is a side elevation illustration of a wind turbine, according to an aspect of the present invention.

FIG. 4 illustrates a side elevation view of a wind turbine 400 including tower 402, nacelle 304 and rotor 308 having blades 312, according to one aspect of the present invention. The tower 402 typically may include multiple sections 406 which may be cylindrical or frusto-conical in shape or have sections 407 that are tapered with a larger diameter near the bottom and a smaller diameter near the top. The reduced diameter section 420 can be comprised of one or more transition sections including one or more tapered sections 422, 423, and zero or more cylindrical sections or waist portions 424. Section 422 can be tapered to have a smaller diameter with increasing elevation, while section 423 can be tapered to have an increasing diameter with increasing elevation. The tower section 406 and lower or first transition section 422 may have a first diameter 430, and the waist portion 424 has a second diameter 440. The first transition section 422 transitions from about the first diameter 430 to about the second diameter 440. The upper or second transition section 423 transitions from the second diameter 440 to a third diameter 450. As non-limiting examples only, sections 422 and 423 may have a conical or frusto-conical shape (as shown in FIG. 4). Section 424 may be cylindrical in shape and may comprise one or more "cans" stacked upon each other. In some applications, it may be desired to omit section 424 and use only sections 422 and 423 instead. The thickness of the tower wall may be increased in all or portions of the reduced diameter section 420, in order to counteract the reduction in either strength or stiffness due to the reduction in tower diameter. Further, the one or more transition sections may have a diameter that transitions from about the first diameter to about the second diameter. Additionally, the reduced diameter tower section may also comprise a first transition section located below and adjacent the waist portion, and a second transition section located above and adjacent to the waist portion, wherein, the first transition section diameter transitions from about the first diameter to about the second diameter, and the second transition section diameter transitions from about the second diameter to about a third diameter, the third diameter being greater than the second diameter and equal to or less than the first diameter.

Figure 5:
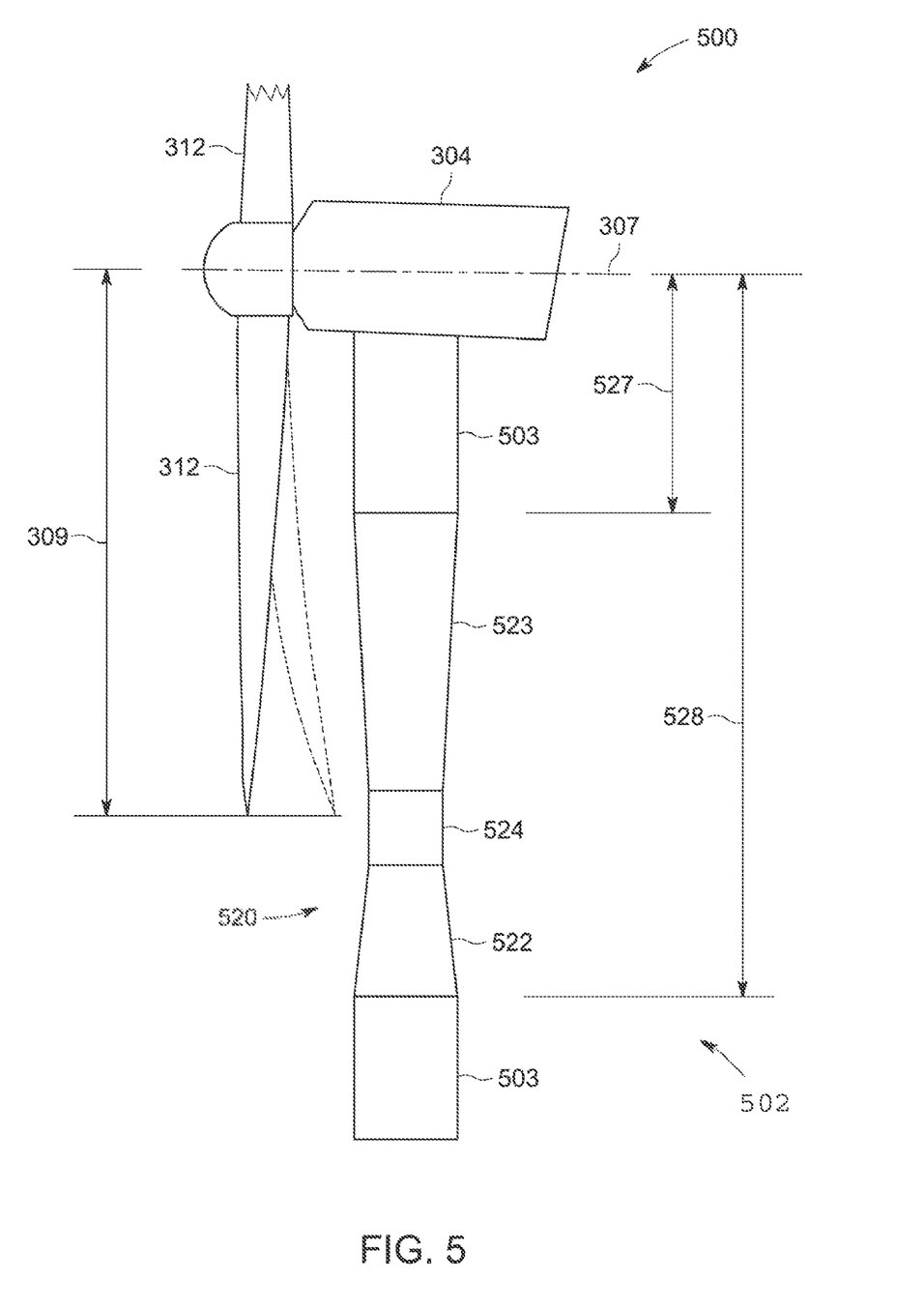
FIG. 5 is a side elevation illustration of a wind turbine, according to an aspect of the present invention.

FIG. 5 illustrates a side elevation view of a wind turbine 500 including tower 502, nacelle 304 and rotor 308 having blades 312, according to one aspect of the present invention. The tower 502 may include multiple sections 503 which may be cylindrical or frusto-conical in shape. The sections 503 may have a tapered shape with a larger diameter near the bottom and a smaller diameter near the top, or a larger diameter near the top and a smaller diameter near the bottom. The reduced diameter section 520 can be comprised of one or more tapered sections 522, 523, and zero or more cylindrical sections 524. Section 522 can be tapered to have a smaller diameter with increasing elevation, while section 523 can be tapered to have an increasing diameter with increasing elevation. As non-limiting examples only, sections 522 and 523 may have a conical or frusto-conical shape. Section 524 may be cylindrical in shape and each section 522, 523 and 524 may comprise one or more "cans" stacked upon each other. In some applications, it may be desired to omit section 524 and use only sections 522 and 523 instead. The thickness of the tower wall may be increased in all or portions of the reduced diameter section 520, in order to counteract the reduction in either strength or stiffness due to the reduction in tower diameter.

The reduced diameter section 520 can be located in any suitable position in tower 502. For example, the top of section 523 can be located a distance 527 of about 50% of the rotor's radius 309 from centerline 307. The narrowest part, or waist portion 524, of the reduced diameter section is preferably located about 100% of the rotor's radius 309 from centerline 307. The bottom of section 522 can be located a distance 528 of about 150% of the rotor's radius 309 from centerline 307. This is but one example, and the top, middle and bottom portions of reduced diameter section 520 can be located at any appropriate position in tower 502, as desired in the specific application.

Figure 6:
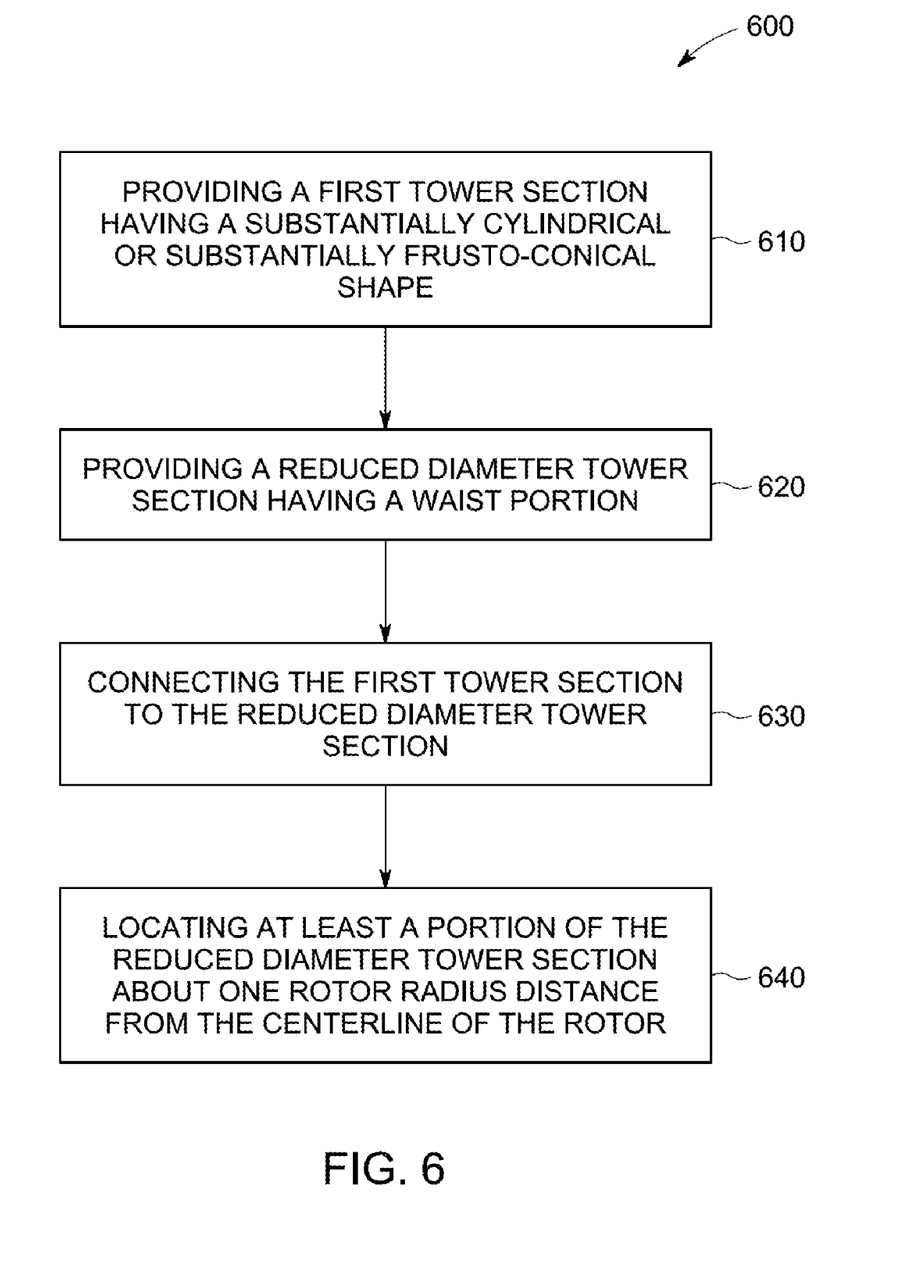
FIG. 6 is a flow chart of a method for fabricating the wind turbine tower as shown in FIGS. 3-5, according to an aspect of the present invention.

FIG. 6 is a flow chart of a method 600 for fabricating or making a wind turbine tower as described herein. In the exemplary embodiment, the method includes providing 610 a first tower section having a substantially cylindrical or substantially frusto-conical shape. The first tower section has at least a first diameter. The method also includes providing 620 a reduced diameter tower section having a waist portion with at least one second diameter, the second diameter being smaller than the first diameter, and connecting 630 the first tower section to the reduced diameter tower section. The providing step 620 can include providing at least a portion of the reduced diameter tower section having a shape chosen from one or more of, generally hourglass, generally hyperbolic, generally concave, generally tapered, and/or generally frusto-conical.

The providing step 620 may also include providing one or more transition sections, in the reduced diameter tower section, the transition sections having a diameter that transitions from about the first diameter to about the second diameter. An additional step can include providing a first transition section having a diameter that transitions from about the first diameter to about the second diameter, where the first transition section is located below and adjacent the waist portion, and providing a second transition section having a diameter that transitions from about the second diameter to about a third diameter, the third diameter being greater than the second diameter and equal to or less than the first diameter, where the second transition section is located above and adjacent to the waist portion.

Another step includes locating 640 at least a portion of the reduced diameter tower section about one radius distance from the centerline of the rotor. The locating step 640 may also include locating the reduced diameter tower section between about 50% of the radius distance to about 150% of the radius distance from the centerline of the rotor. The location of the reduced diameter tower section could also span longer or shorter portions of the tower, as desired by the specific application.

Exemplary embodiments of a wind turbine, wind turbine tower and methods for fabricating or making the same are described above in detail. The methods and devices described herein are not limited to the specific embodiments described herein, but rather, components of the devices and/or steps of the methods may be utilized independently and separately from other components and/or steps described herein. For example, the devices and methods described herein may have other applications not limited to practice with wind turbines, as described herein. Rather, the methods and devices described herein can be implemented and utilized in connection with various other industries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine including a rotor, the rotor having one or more blades and a rotor radius distance approximately equal to the distance measured from a centerline of the rotor to a tip of one of the one or more blades, and a tower having a plurality of tower sections, the wind turbine comprising:
   a first tower section having a generally cylindrical or frusto-conical shape, the first tower section having at least one first diameter;
   a reduced diameter tower section connected to the first tower section, the reduced diameter tower section having a waist portion with at least one second diameter, the second diameter being smaller than the first diameter, the reduced diameter tower section further comprising a first transition section located below and adjacent the waist portion, and a second transition section located above and adjacent to the waist portion, wherein, the first transition section diameter transitions from about the first diameter to about the second diameter, and the second transition section diameter transitions from about the second diameter to about a third diameter, the third diameter being greater than the second diameter and equal to or less than the first diameter; and
   wherein, at least a portion of the reduced diameter tower section having the second diameter is located about one radius distance from the centerline of the rotor, the reduced diameter section providing increased static clearance to the tip of the one or more blades.

2. The wind turbine of claim 1, wherein the reduced diameter tower section is located between about 50% of the radius distance to about 150% of the radius distance from the centerline of the rotor.

3. The wind turbine of claim 1, wherein at least a portion of the reduced diameter tower section has a shape chosen from one or more of:
   generally hourglass, generally concave, generally tapered, and generally frusto-conical.

4. The wind turbine of claim 1, wherein the waist portion is located between about 50% of the radius distance to about 150% of the radius distance from the centerline of the rotor.

5. A wind turbine tower for supporting a rotor, the rotor having one or more blades and a rotor radius distance approximately equal to the distance measured from a centerline of the rotor to a tip of one of the one or more blades, the wind turbine tower having a plurality of tower sections, the wind turbine tower comprising:
   a first tower section having a generally cylindrical or frusto-conical shape, the first tower section having at least one first diameter;
   a reduced diameter tower section connected to the first tower section, the reduced diameter tower section having a waist portion with at least one second diameter, the second diameter being smaller than the first diameter, and the reduced diameter tower section comprising, a first transition section located below and adjacent the waist portion, and a second transition section located above and adjacent to the waist portion, wherein, the first transition section diameter transitions from about the first diameter to about the second diameter, and the second transition section diameter transitions from about the second diameter to about a third diameter, the third diameter being greater than the second diameter and equal to or less than the first diameter; and
   wherein, at least a portion of the reduced diameter tower section having the second diameter is located about one radius distance from the centerline of the rotor, the reduced diameter section providing increased static clearance to the tip of the one or more blades.

6. The wind turbine tower of claim 5, wherein the reduced diameter tower section is located between about 50% of the radius distance to about 150% of the radius distance from the centerline of the rotor.

7. The wind turbine tower of claim 5, wherein at least a portion of the reduced diameter tower section has a shape chosen from one or more of:

generally hourglass, generally concave, generally tapered, and generally frusto-conical.

8. The wind turbine tower of claim 5, wherein the waist portion is located between about 50% of the radius distance to about 150% of the radius distance from the centerline of the rotor.

9. A method for providing a wind turbine tower, the wind turbine tower for supporting a rotor, the rotor having one or more blades and a rotor radius distance approximately equal to the distance measured from a centerline of the rotor to a tip of one of the one or more blades, the wind turbine tower having a plurality of tower sections, the method comprising:

providing a first tower section having a substantially cylindrical or substantially frusto-conical shape, the first tower section having at least one first diameter;

providing a reduced diameter tower section having a waist portion with at least one second diameter, the second diameter being smaller than the first diameter;

providing a first transition section having a diameter that transitions from about the first diameter to about the second diameter, and located below and adjacent the waist portion;

providing a second transition section having a diameter that transitions from about the second diameter to about a third diameter, the third diameter being greater than the second diameter and equal to or less than the first diameter, and located above and adjacent to the waist portion;

connecting the first tower section to the reduced diameter tower section; and locating at least a portion of the reduced diameter tower section about one radius distance from the centerline of the rotor.

10. The method of claim 9, further comprising:

locating the reduced diameter tower section between about 50% of the radius distance to about 150% of the radius distance from the centerline of the rotor.

11. The method of claim 9, further comprising:

providing at least a portion of the reduced diameter tower section having a shape chosen from one or more of, generally hourglass, generally concave, generally tapered, and generally frusto-conical.

12. The method of claim 9, further comprising:

locating the waist portion between about 50% of the radius distance to about 150% of the radius distance from the centerline of the rotor.

\* \* \* \* \*